Patented May 22, 1951

2,553,900

UNITED STATES PATENT OFFICE 2,553,900

METHOD OF TRACING THE UNDERGROUND FLOW OF WATER

Richard L. Doan and Edwin Fast, Bartlesville, Okla., assignors to Phillips Petroleum Company, a corporation of Delaware No Drawing. Application December 29, 1947, Serial No. 794,424

8 Claims. (Cl. 166—21)

This invention relates to tracing the flow of underground waters by injecting a small quantity of an inexpensive water soluble salt containing the element boron. In a preferred embodiment of the invention this salt is borax (sodium tetraborate $Na_2B_4O_7.10H_2O$). In a specific embodiment this invention relates to adding such a salt to injection water in a waterflood project and detecting the arrival of the boron in the flood water at various points in the flooded area. In one specific embodiment, which is preferred, the presence of boron in samples of the water is determined by its emission spectrum. In a preferred embodiment said emission spectrum is measured at one or more wave lengths especially 2498 and 2497 angstrom units (in round numbers).

A satisfactory tracer for use in tracing the flow of underground waters, such as water injected in a waterflood operation, has never been developed prior to this invention, although a number of materials have been proposed for this purpose. All the materials proposed by the prior art failed in one or more important characteristics. Such a material must be easily detectable and quantitatively measurable in very small concentrations. It must be water soluble in the concentration range involved, must be a rare constituent of underground waters, must not be precipitated out of solution by ions present in natural underground salt water or brine and it must not be absorbed to any appreciable extent on the surface of the rocks and sand through and over which it passes. Finally, this material must be readily available and relatively inexpensive in order to be of commercial value.

Borax (sodium tetraborate $Na_2B_4O_7.10H_2O$) is the only substance which fulfils all of these requirements for a satisfactory tracing agent. Nevertheless, in spite of the domestic and commercial use of borax no one before the present inventors ever recognized that borax was an ideal tracing agent; even though such a tracing agent has been searched for diligently by those in the water or oil well business and by geologists for over fifty years. Numerous more expensive substances have been suggested and tested only to be discarded as inoperative upon test.

Other water soluble relatively inexpensive boron containing compounds, or boron compounds which hydrolize in water to form the same, may be employed to some extent in practicing the present invention, but borax is very much preferred because it is the cheapest, most readily available, most stable and readily water soluble salt of boron. The sodium present in the borax has no effect on its value as a tracing agent. In its broadest aspect the present invention may employ any water soluble compound containing boron, but the use of borax is highly preferable to such an extent that borax is critically different from and superior to other water soluble boron compounds, even as they in turn are critically different and superior to any other materials when used as tracing agents.

For example boric acid ($H_3BO_3$) and other acids containing boron can be used. Boron trioxide ($B_2O_3$) can be added to the water to form soluble compounds. Boron halides, such as boron fluoride ($BF_3$), chloride, bromide or iodide, can be added to the water to hydrolize and form soluble boron compounds. Various other metal borates can be used in place of borax, alkali metal tetraborates and ammonium tetraborates being preferred. Such is the cheapness and availability of borax, however, that no other boron compound is likely to be used, except that if they were not covered in this present disclosure they might be used in an effort to avoid infringement.

One object of the present invention is to provide a method of tracing underground movement of waters by the use of a tracing agent containing the element boron.

Another object is to provide a suitable tracing agent for tracing the underground movement of water, comprising water soluble compounds of boron, or boron compounds which hydrolize to form the same, borax being preferred.

Another object is to provide a method of tracing underground movement of waters by any known type of spectrographic analysis having relation to the presence of boron in any form in samples of said waters; generally, but not necessarily, with reference to the wave lengths of 2498 and 2497 angstrom units.

Numerous other objects and advantages of record will be apparent to those skilled in the art upon reading the accompanying specification and claims.

The element boron has two characteristic lines in its emission spectrum at wave lengths of 2498 and 2497 angstrom units, respectively, either of which, or both of which, can be used for detection purposes. These lines show up in measurable intensities and boron concentrations at only a few parts per million. Boron is not a common constituent of oil field connate waters, nor of the usual underground waters, such as salt waters, or connate brine, boron ordinarily being present at most to the extent of two or three parts per million. There is, therefore, little chance of confusing the tracer with any constituent already present in the underground brine, water or other fluid, because, while only small amounts of borax need be added, these amounts will still be much greater than any boron naturally present.

Borax meets every requirement of a perfect tracer, namely: it is easily detected and measured quantitatively in small concentrations; it is soluble in flood waters; it is relatively rare in formation waters; it is not precipitated to any great extent by constituents of formation brines; it is not adsorbed appreciably by reservoir rocks; it is readily available; and is inexpensive.

In an oil field in which a number of oil wells have been drilled and oil has been produced from these wells over a number of years there finally arrives a time when oil no longer flows into the well in sufficient quantity to be recoverable from an economic standpoint. When such conditions are finally present it is often economically possible to force a liquid such as water down some of the wells to flood the formation which still contains perhaps 75% of the oil it originally contained. Depending upon formation structure, such as differences in permeability caused by fractures or more porous portions, the water flooding the formation will force oil and other water ahead of it into certain of the oil wells from which they may be recovered. A greater or less amount of the oil remaining in the formation is thereby recovered and the percentage that is recoverable depends largely upon the proper selection of the water input wells and the amounts of water forced into them. The more that the operator knows about what conditions are underground the more intelligently he can control the operation and in turn the more oil will be recovered.

At the output wells the oil and water being produced can be separated and the water tested to determine whether it is connate water or whether it is input water used in the waterflood if a tracing agent of a satisfactory nature has been placed in the input water used for the waterflood.

In practicing the present method borax is added to the injection water in sufficient quantity to give preferably from 25 to 50 parts per million of boron in the water. The minimum amount that may be used depends on the amount of boron present in the connate water of the reservoir into which the injection water is to be injected in order that the two waters may be readily distinguished. In some instances as little as five parts per million of boron will be sufficient in the input water and in many instances 15 parts per million of boron will give just as satisfactory results as 25 parts per million of boron. However, it is preferred to use from 25 to 50 parts per million. 25 parts per million of boron is roughly 60 pounds of borax per one thousand barrels of water (42 gal. barrels). As for any upper limit as to the amount of boron added to the injection water, such an upper limit is merely an economic one as the addition of the borax becomes subject to a law of diminishing returns in that if 50 parts per million gives satisfactory results there is little object in adding more of the boron containing salt. However, the only other upper limit aside from cost is the limit of water solubility of the particular boron containing salt selected, which for borax is 1.3 grams per 100 milliliters in cold water. Obviously, no one is going to employ anywhere near the upper limit of solubility of borax because of the unnecessary expense.

The borax is added to the injection water at the input well and production of oil and water occurs at the output wells where the water produced is separated from the oil produced and collected at regular intervals from selected wells for spectrographic analysis preferably in the region of the boron lines having wave lengths of 2498 and 2497 angstrom units respectively. This makes it possible to follow the build up of boron in the water arriving at various locations in the flood pattern.

COMPARISON BETWEEN BORAX AND LITHIUM CHLORIDE

In order to show the superiority of water soluble boron containing salts (especially borax) over other materials in the practice of the method of Example A the following table has been prepared comparing boron with its nearest competitor lithium:

Table

| | Boron | Lithium |
|---|---|---|
| Detection | {2,496.78A} {2,397.73A} Ultra violet, both dominant, good. | 6,707.86A Red} Visible region, not dominant over 4,603.0A Blue} other materials, not good. |
| Effective Dilution, detectable. | 1 part in 1,000,000 | 1 part in 10,000. |
| Available | Readily | Not readily. |
| Cost [1] | $0.12 lb. (Borax) | $2.41 lb. (Lithium Chloride). |

[1] Subject to some variation.

From a cost basis it will be seen that borax is two thousand times as effective as lithium chloride because the lithium salt costs twenty times as much as borax and one hundred times as much has to be employed to obtain the same result. Lithium also is a much more common constituent of connate waters and, therefore, still more lithium salts must be employed in order to distinguish from lithium containing connate waters which do not have more than two parts per million lithium. It is well known that many natural springs produce lithium waters, which waters are noted for their good taste and are bottled and sold for drinking purposes. This natural occurrence of large amounts of lithium in connate waters reduces the value of lithium as a tracing agent.

Example A

As an example, the amount of boron normally present in the connate water in a representative oil field was tested and found to be not more than about two parts per million. When flood waters originally containing from 5 to 50 parts per million of boron arrive at the output wells in such a field the connate water of which contains not more than two parts per million of boron, it is very easy to determine the time of arrival of the injection water. From the time of the arrival of the injection water at various output wells data can be computed which is of great value to geologists and petroleum engineers in planning future operations in the waterflood project in order to recover the maximum recoverable amount of oil.

*Example B*

Sometimes it is useful to trace possible contamination of water in water wells. In such cases the borax is preferably added to the suspected source of contamination in a water solution containing from 15 to 200 parts per million of boron but preferably containing as much more borax as may seem economical at the time. The water well or water wells which are suspected of being contaminated are then pumped for a long time and at intervals samples of the produced water are collected and tested by spectrographic analysis as in Example A above. A large increase in the amount of boron present in the produced water indicates that contamination is occurring and that proper measures should be taken immediately to remove the source of contamination or to employ the water produced only for purposes for which the contamination is not important.

*Example C*

In a certain waterflood project, in a certain oil field, the input water being used was tested spectrographically. Photographs were taken of the spectrum of said input water and the density of the photographs at those parts which received ultraviolet waves of 2498 and 2497 angstrom units was measured by a microphotometer (or microdensitometer). The increase in density of these lines upon adding known amounts of boron containing substances to the water shows that the original water contains less than 2 parts per million of boron.

Sixty pounds of borax per 1,000 barrels of said water is added to said input water for one week.

Samples of water are taken at the producing well and these are tested by the same photographic density method employed in the second paragraph above. At the end of the week these samples test 5 parts per million boron, which can only be accounted for by the arrival of boron enriched water from the input well at the producing well.

While we have disclosed four examples as illustrative embodiments of the practice of our invention, the same is not limited thereby, but the scope of said invention is determined by the following claims.

Having described our invention, we claim:

1. The process of tracing the flow of water underground which comprises enriching said water at one underground point with enough of a water soluble boron containing compound to provide a portion of said water with a boron content much greater than before, taking samples of water at a second underground point remote from said first point, and quantitatively testing said samples spectrographically for the presence of boron as an indication of the arrival of said enriched water at said second point.

2. The process of tracing the flow of water underground which comprises enriching said water at one underground point with enough borax to provide a portion of said water with a boron content much greater than before, taking samples of water at a second underground point remote from said first point, and quantitatively testing said samples spectrographically for the presence of boron as an indication of the arrival of said enriched water at said second point.

3. The process of tracing the flow of water underground which comprises enriching said water at one underground point with enough of a water soluble boron containing compound to provide a portion of said water with a boron content much greater than before, taking samples of water at a second underground point remote from said first point, and quantitatively testing said samples spectrographically at from 2495 to 2499 angstrom units for the presence of boron as an indication of the arrival of said enriched water at said second point.

4. The process of tracing the flow of water underground which comprises enriching said water at one underground point with enough borax to provide a portion of said water with a boron content much greater than before, taking samples of water at a second underground point remote from said first point, and quantitatively testing said samples spectrographically at from 2495 to 2499 angstrom units for the presence of boron as an indication of the arrival of said enriched water at said second point.

5. The process of water flooding an oil field and tracing the progress of water used in said flooding, in which water is forced down an input well to force liquid out of at least one production well, comprising the steps of adding to said flooding water enough of a water soluble boron containing compound to provide said water with a boron content of from 5 parts per million to that present in a saturated water solution of said compound, taking samples of water from one production well and testing said samples for the presence of boron as an indication of the arrival of said flooding water at said production well.

6. The process of water flooding an oil field and tracing the progress of water used in said flooding, in which water is forced down an input well to force liquid out of at least one production well, comprising the steps of adding to said flooding water enough borax to provide said water with a boron content of from 5 parts per million to that present in a saturated water solution of borax, taking samples of water from one production well and testing said samples for the presence of boron as an indication of the arrival of said flooding water at said production well.

7. The process of water flooding an oil field and tracing the progress of water used in said flooding, in which water is forced down an input well to force liquid out of at least one production well, comprising the steps of adding to said flooding water enough of a water soluble boron containing compound to provide said water with a boron content of from 5 parts per million to that present in a saturated water solution of said compound, taking samples of water from one production well and testing said samples at from 2495 to 2499 angstrom units for the presence of boron as an indication of the arrival of said flooding water at said production well.

8. The process of water flooding an oil field and tracing the progress of water used in said flooding, in which water is forced down an input well to force liquid out of at least one production well, comprising the steps of adding to said flooding water enough borax to provide said water with a boron content of from 5 parts per million to that present in a saturated water solution of borax, taking samples of water from one production well and testing said samples at from 2495 to 2499 angstrom units for the presence of boron as an indication of the arrival of said flooding water at said production well.

RICHARD L. DOAN.
EDWIN FAST.

REFERENCES CITED

The following references are of record in the file of this patent:

UNITED STATES PATENTS

| Number | Name | Date |
| --- | --- | --- |
| 2,318,689 | Hodell et al. | May 11, 1943 |
| 2,330,026 | Blau | Sept. 21, 1943 |
| 2,414,913 | Williams | Jan. 28, 1947 |
| 2,429,577 | French | Oct. 21, 1947 |